(12) United States Patent
Rossmann

(10) Patent No.: US 10,671,987 B2
(45) Date of Patent: *Jun. 2, 2020

(54) SYSTEM AND METHOD FOR INTERACTING WITH A SELF-SERVICE TERMINAL

(71) Applicant: NCR Corporation, Atlanta, GA (US)

(72) Inventor: Wolf Rossmann, Scotland (GB)

(73) Assignee: NCR Corporation, Atlanta, GA (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/880,108

(22) Filed: Jan. 25, 2018

(65) Prior Publication Data

US 2018/0150814 A1    May 31, 2018

Related U.S. Application Data

(63) Continuation of application No. 11/821,124, filed on Jun. 22, 2007, now Pat. No. 9,898,722.

(51) Int. Cl.
| | | |
|---|---|---|
| *G06Q 40/00* | (2012.01) | |
| *G06Q 20/18* | (2012.01) | |
| *G06Q 20/10* | (2012.01) | |
| *G06Q 40/02* | (2012.01) | |
| *G07F 19/00* | (2006.01) | |

(52) U.S. Cl.
CPC ......... *G06Q 20/18* (2013.01); *G06Q 20/1085* (2013.01); *G06Q 40/02* (2013.01); *G07F 19/20* (2013.01); *G07F 19/206* (2013.01); *G07F 19/211* (2013.01)

(58) Field of Classification Search
CPC ........ G06Q 20/18; G06Q 30/06; G06Q 40/00; G06Q 20/042; G06Q 20/1085; G06Q 20/00

See application file for complete search history.

(56) References Cited

U.S. PATENT DOCUMENTS

| | | | |
|---|---|---|---|
| 6,769,606 B1 * | 8/2004 | Blosser ................ | G06Q 20/209 235/379 |
| 2003/0033249 A1 * | 2/2003 | Ingram ................ | G06Q 20/108 705/43 |
| 2003/0120597 A1 * | 6/2003 | Drummond ............. | G06F 3/023 705/43 |

(Continued)

OTHER PUBLICATIONS

Cisco (Designing ATM Internetworks https://www.cisco.com/cpress/cc/td/cpress/ccie/ndcs798/nd2008.htm, Feb. 8, 2001) (Year: 2001).*

*Primary Examiner* — Bruce I Ebersman
*Assistant Examiner* — Mark H Gaw
(74) *Attorney, Agent, or Firm* — Schwegman, Lundberg & Woessner

(57) ABSTRACT

Systems and methods for processing custom structured tags at a self-service terminal are disclosed. Custom structured tags received by a self-service terminal can include information to identify one or more devices attached to the terminal and identify one or more types of data to be obtained from a user by use of the attached devices. In some embodiments, a browser can natively interpret the custom structured tags. The self-service terminal can also be configured to receive and decode structured tags identifying or more actions to be performed by the device, such as printing a transaction record or dispensing currency.

11 Claims, 7 Drawing Sheets

(56) References Cited

U.S. PATENT DOCUMENTS

2014/0172533 A1* 6/2014 Andrews ............ G06Q 30/0226
  705/14.27
2014/0297385 A1* 10/2014 Ryan .................. G06Q 30/0226
  705/14.27

* cited by examiner

100

```
<html>
<head>
<link REL="StyleSheet" HREF="../style/style.css" TYPE="text/css"
MEDIA="screen,print">
```
102
```
<OBJECT ID=KEYPAD
    CLASSID="clsid:9F2CEB17-8911-11D6-BD60-111111111111" VIEWASTEXT>
</OBJECT>
<A ID="lkEnglishSelected" HREF="English\EnterPin.htm"></A>
<A ID="lkSpanishSelected" HREF="Spanish\EnterPin.htm"></A>
<A ID="lkCancel" HREF="Englis\KeyPadError.htm"></A>
```
104
```
<script language="VBScript">
'==================
Sub window_onLoad()
'==================
    KEYPAD.ActiveKeys.ActivateFK_FDK04
    KEYPAD.ActiveKeys.ActivateFK_FDK08
    KEYPAD.GetKey
end sub
'==================
Sub PINPAD_Error()
'==================
    lkCancel.click
end sub
'====================================
Sub KEYPAD_KeyPressed(Key, Name)
'====================================
    Select Case Key
        Case 35:   'FDK4
            FDK4.click
        Case 39:   'FDK8
            FDK8.click
    End Select
end sub
'======================
Sub EnglishSelected()
'======================
    FDK4Image.src = "../images/LeftFDKPressed.gif"
    lkEnglishSelected.click
End Sub
'======================
Sub SpanishSelected()
'======================
    FDK8Image.src = "../images/RightFDKPressed.gif"
    lkSpanishSelected.click
End Sub
</script>
<title>Select Language</title>
</head>
<BODY>
<P class="Title">Please select the language</P>
<P class="SubTitle"><FONT color=yellow>Selecione el idioma</FONT></P>
```
106
```
<!-- FDK4 -->
<DIV ID="FDK4"
    onClick="EnglishSelected()">
    <IMG class=FDK4 id=FDK4Image src="../images/LeftFDK.gif" >
    <P class=FDK4Text>English</P>
</DIV>
```
108
```
<!-- FDK8 -->
<DIV ID="FDK8"
    onClick="SpanishSelected()">
    <IMG class=FDK8 id=FDK8Image src="../images/RightFDK.gif">
    <P class=FDK8Text>Espanol</P>
</DIV>
</BODY>
</html>
```

FIG. 1

Prior Art

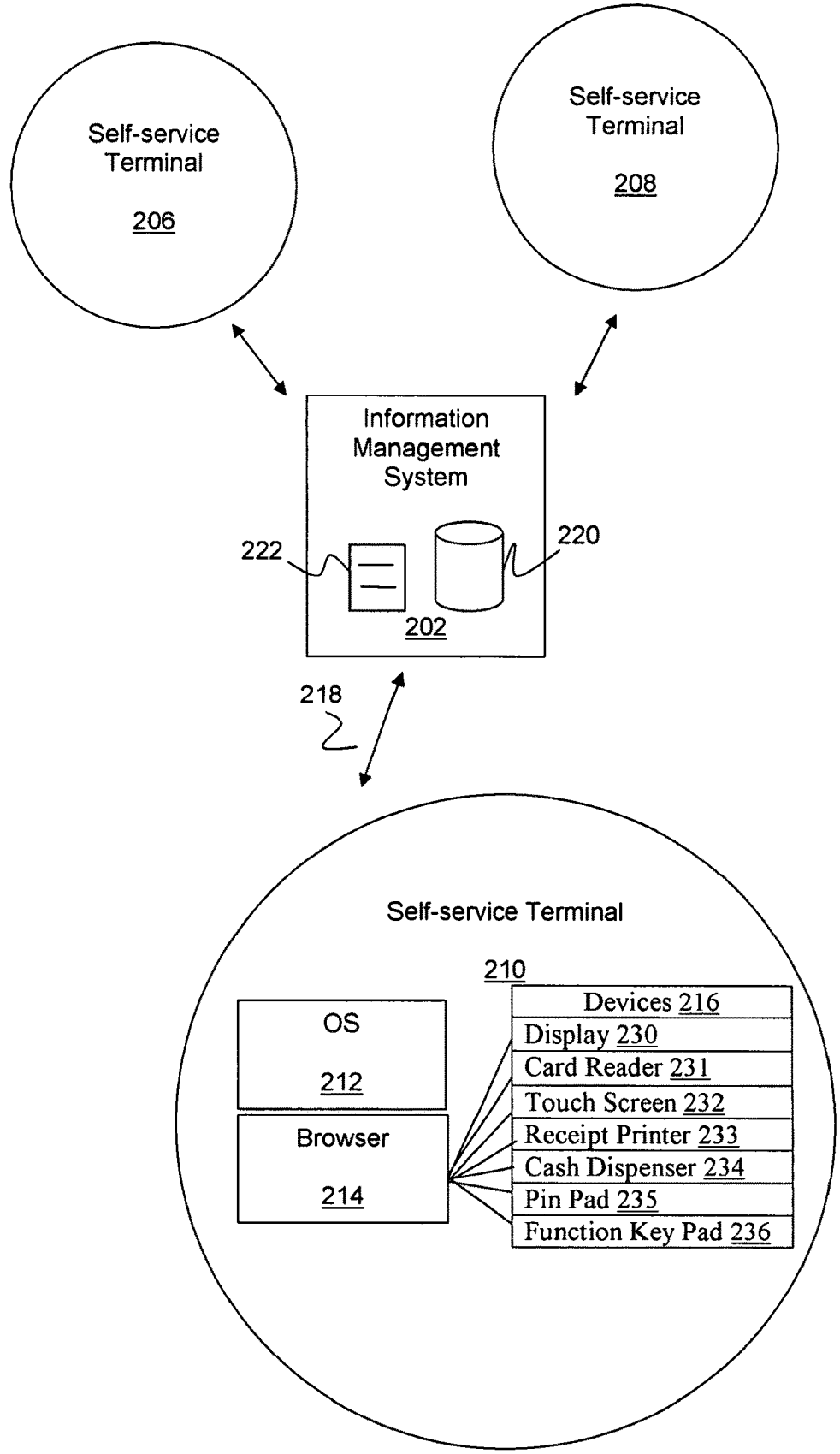

```
<html>
<head>

<link REL="StyleSheet" HREF="../style/style.css"
TYPE="text/css" MEDIA="screen,print">

<title>Select Language</title>

</head>

<BODY>

<P class="Title">Please select the language</P>
<P class="SubTitle"><FONT color=yellow>Selecione el
idioma</FONT></P>
```

```
<!-- FDK4 -->
<KeyPad id="FDK4" encryption="None" class=FDK4
image="../images/LeftFDK.gif"
selectedImage="../images/LeftFDKPressed.gif"
onClick="English\EnterPin.htm"
onError="English\KeyPadError.htm">
   <P class=FDK4Text>English</P>
</KeyPad>
```
602

```
<!-- FDK8 -->
<KeyPad id="FDK8" encryption="None" class=FDK8
image="../images/RightFDK.gif"
selectedImage="../images/RightFDKPressed.gif"
onClick="Spanish\EnterPin.htm"
onError="English\KeyPadError.htm">
   <P class=FDK8Text>Espanol</P>
</KeyPad>
```
604

```
</BODY>
</html>
```

```xml
<?xml version="1.0" encoding="utf-16"?>
<Screen
xmlns:xsd="http://www.w3.org/2001/XMLSchema"
xmlns:xsi="http://www.w3.org/2001/XMLSchema-
instance">
  <Language Code="eng">
    <Labels>
      <Label Name="" Size="25" Bold="true" X="0"
Y="100" HorAlignment="Center" Text="Please select
language" UnclickColour="-266" />
    </Labels>
    <Graphics />
    <Buttons>
      <Button Name="F4" Type="Default" Key="eng"
Enabled="true" Visible="true" IconPath=""
AltKey="64">
        <Label Name="" Size="21" Bold="true"
X="124" Y="20" HorAlignment="Center"
AlignmentBenchmark="200" Text="English"
ClickColour="-2570" UnclickColour="-16777216" />
      </Button>
      <Button Name="F8" Type="Default" Key="esp"
Enabled="false" Visible="true" IconPath=""
AltKey="64">
        <Label Name="" Size="21" Bold="true"
X="124" Y="20" HorAlignment="Center"
AlignmentBenchmark="200" Text="Español"
ClickColour="-2570" UnclickColour="-16777216" />
      </Button>
    </Buttons>
    <Animations />
    <Prompts />
  </Language>
</Screen>
```

701

702

SYSTEM AND METHOD FOR INTERACTING WITH A SELF-SERVICE TERMINAL

BACKGROUND

Self-service terminals are frequently used in a variety of industries to provide customers with added convenience. Typical automated self-service terminals, such as automatic teller machines (ATMs) and airline check-in kiosks, occupy a relatively small amount of space and can be placed in convenient locations. These terminals can be used to perform basic functions usually performed by a personal representative. The use of self-service terminals can result in significant cost savings to the provider of the service and increased convenience for customers.

Self-service terminals are typically programmed to receive certain information from a user by use of a number of different input devices used to acquire that information. The relevant information is then transmitted to a centralized system for completion of transactions.

Many self-service terminals are embodied as "thick clients." A thick client (also referred to as a fat client or rich client) typically differs from a thin client in that the thick client includes additional software and additional local processing abilities. Thick clients can support complex coding, complete software applications, web scripting and add-ons such as Java applets. Some thick clients obtain information for transmission to a central server by the use of Java applets or Active-X controls which control and interact with input devices as needed.

In a thick client system, applets and Active-X controls must be implemented on each individual client. These software implementations may differ from client to client depending on the operating system implemented on the client. Client functionality changes and updates are implemented by downloading new software to the individual thick clients. Typical thick client implementations may require individualized software updates and testing when software installed on the thick client is modified. If a large number of thick clients are deployed, these updates can be cumbersome and inefficient.

Programming individual client-server systems based on thick clients may also be more difficult. Software must be written for each individual type of client machine. These additional programming problems present deployment problems in installing the software on the clients. This in turn requires additional effort and resources for the deployment of thick client-server systems.

BRIEF DESCRIPTION OF THE DRAWINGS

FIG. 1 depicts a prior art example a web page for interacting with a keypad device object.

FIG. 2 depicts an example of a system for communication between a plurality of self-service terminals and a central information management system.

FIG. 6 depicts an example of a web page containing multiple customized tags.

FIG. 7 depicts an example of a web page containing multiple customized tags.

DETAILED DESCRIPTION OF THE INVENTION

Figure 3:
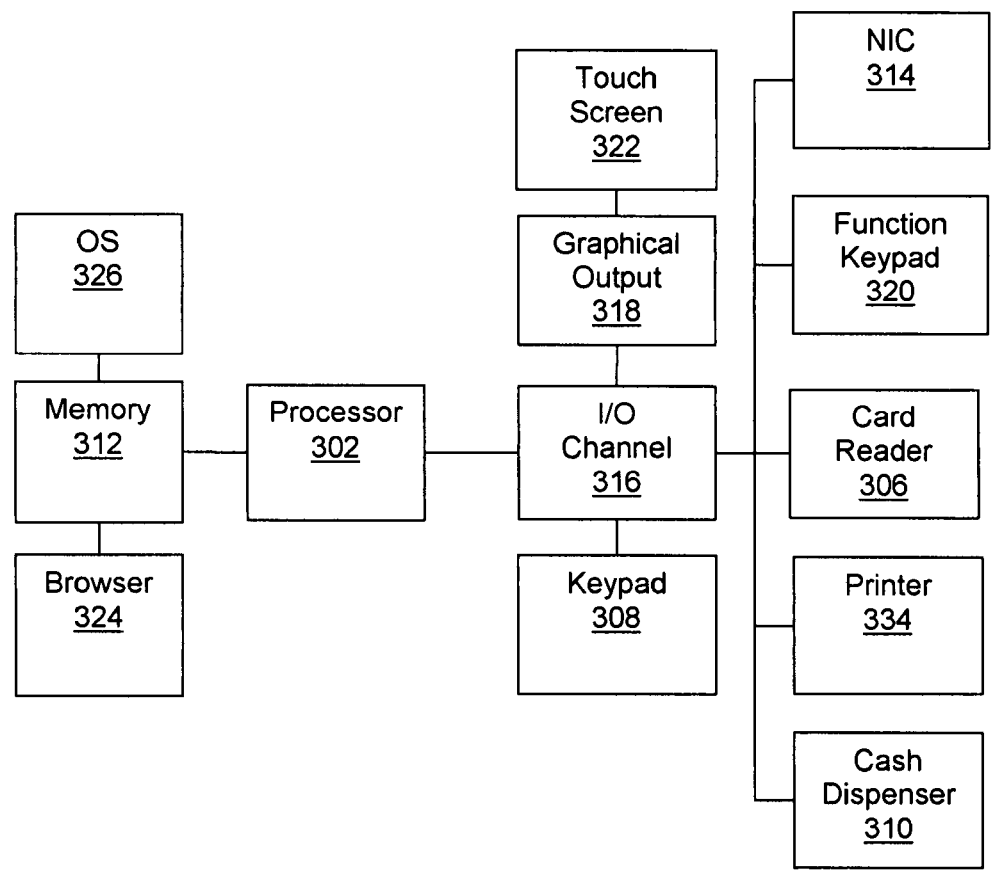
FIG. 3 illustrates an architecture for a thin-client self-service terminal.

In a broad sense, systems and methods for operating a thin-client self-service terminal are disclosed. The thin-client self-service terminal disclosed herein can be configured to natively interpret and communicate with a remote server using customized structured tags.

FIG. 1 depicts an example of prior art HTML code 100 for interacting with a keypad device object. As illustrated, this interaction is performed by way of a Java applet or Active-X control called by the HTML code 100. HTML code 100 may include code for a keypad object 102, a script 104 for interacting with the keypad, and function calls 106 and 108. In the example of FIG. 1, prior art HTML code 100 creates KEYPAD device object 102 as well as script 104 for interacting with keypad object 102. Function call 106 operates to accept an English language selection as input from a user. Function call 108 operates to accept a Spanish language selection as input from a user. Thus, the prior art system required the use of separate software in the form of a Java applet or Active-X control to interact with a device such as a keypad. The use of separate Java applets and Active-X controls requires additional processing resources at the client, makes updating multiple terminals more difficult, and introduces potential security problems.

In implementing the self-service terminal described in more detail below, a thin client can be used. A self-service terminal operating as a thin client maintains a reduced set of local resources so that the majority of operations are completed on a remote server. In some embodiments, the self-service terminal can acquire data from local input devices. These local input devices may be identified by the use of customized markup language tags received by the thin client.

The self-service terminal described herein can include a terminal browser. The terminal browser can be a software component adapted from a standard browser. In some embodiments, a standard browser such as Microsoft Internet Explorer or Firefox Mozilla can be used. Alternatively, a proprietary custom browser could be developed or a different browser used. The terminal browser can be modified or otherwise configured to natively interpret custom structured markup language data and/or tags. The custom tags can instruct the browser to interact with the self-service terminal to display information, operate the specific devices, and interact with the user. As non-limiting examples, the tags can be used to request an input from a specific device or provide an output to a specific device and/or identify an input-output device and specify the desired input or output at the identified device. In some embodiments, the browser installed at the self-service terminal can be recompiled with additional source code enabling it to natively interpret the customized markup language.

A custom structured tag formatted for use in the markup language may be created according to any of a variety of formats, schemas or languages. In some embodiments, the tag is an Extensible Markup Language (XML) tag. As a further non-limiting example, an Extensible HyperText Markup Language (XHTML) extension could be used to implement a customized markup language. Other types of tags could be used. In some embodiments, a restriction or extension of XHTML can be implemented such that features which pose a security threat to high value self-service terminals (such as scripting, support for applets, and access to local software) are removed and XHTML tags to interact with the certain devices described below are added.

The thin client can accept user information and transmit it for processing at a central server. The central server then processes any related transactions and provides information and instructions back to the thin client. For example, a user could provide an ATM card to a thin client such as an ATM, and request cash. The thin client would not process the transaction locally, rather it would accept the user's request and information and then provide the information to a bank operating a remote server which would process the transaction.

The structured tag for use with a customized markup language can be transmitted by a remote server to the client. Transmission of the structured tag between client and server may be by any of a number of different protocols. In some embodiments, hypertext transfer protocol (HTTP) and/or secure hypertext transfer protocol (HTTPS) can be used. Other protocols suitable for transmitting data could also be used in addition to or instead of HTTP and HTTPS.

The thin client described herein may be easier to maintain. Because at least portions of the processing are performed by a remote server, the thin client is not required to store and execute complicated software. Rather, in some embodiments, the thin client can be based on a web browser. Thus, any updates to enhance or modify a user's experience would relate to web pages and programs stored at the remote server and the relevant changes would be performed to those pages and programs at the remote server. As a result, the user experience at any number of thin clients can be modified with updates to a single remote server.

FIG. 2 depicts a functional overview of client-server system 200 for communication between a plurality of self-service terminals and a central information management system or server. System 200 can include information management system 202, and self-service terminals 206, 208, and 210. In some embodiments, one or all of the self-service terminals 206, 208, and 210 can be thin clients.

Self-service terminal 210, illustrated in additional detail, can further include an operating system (OS) 212 and a browser 214. The terminal 210 can be configured to communicate with database 220 and server 222 of information management system 202 by network 218. Browser 214 can be configured to communicate with input and/or output devices 216. As non-limiting examples, input-output devices can include a display screen 230, a touch screen 232, function keys 236, limited or full keyboards (not illustrated), a card reader 231, a card writer (not illustrated) with support for chip cards and card eject/retract functionality, and pin entry on secure device 235. Additional functionality at the self-service terminal can include, but is not limited to, security management (for managing encryption keys and certificates and ensuring device commands are authorized), printing on specialized printers (statement and receipt), dispensing and acceptance of cash/envelopes and checks, bar code readers, biometric identification devices, and a mechanism to inform the server of terminal capabilities.

Information management system 202 can transmit a customized structured tag to self-service terminal 210 with a request for information from one of the attached input devices 216. The request for input can be delivered to the web browser 214 operating on self-service terminal 210 in accordance with OS 212. The request for input will be satisfied by self-service terminal 210, and processing may be carried out by information management system 202.

As a non-limiting example, server 222 may transmit a request for input from a card such as a banking card present at the self-service terminal 210. Self-service terminal 210 can receive the request as a customized structured tag from information management system 202. The request can be formatted in the following manner:

```
<CardReader Name="cardreader1" Method="Enable"
ReadComplete="http://xxx/yyy1"
ReadError="http://xxx/yyy2">
<Input name="Track2" type="CardTrackData"/>
<Input name="CardReaderError" type="CardReaderStatus"/>
</CardReader>
```

In response to this code, self-service terminal 210 can select the corresponding input device from devices 216, in this case, card reader 231. After receiving and interpreting the customized tag, self-service terminal 210 acquires input from card reader 231. In the case of a card reader, the reader may acquire the requested data from a user who swipes or inserts a card into self-service terminal 210. The input data may be acquired from a data track on the card, such as one of the plurality of tracks on a magnetic swipe card. In the example request illustrated above, the customized tag could be used to instruct browser 214 to collect input from a user. In the example, "xxx" and "yyy" are placeholders for addresses of relevant resources accessible from an information management system.

Once input has been received from a user operating one or more of devices 216, self-service terminal 210 via browser 214 creates a message containing the user input, or a part of the user input, and transmits that message back to information management system 202 via network 218.

Information management system 202 receives the message transmitted by self-service terminal 210. Information management system 202 may store the message or part of the message in database 220, and processes the message using server 222. The results of the processing may be stored in database 220. Ultimately, server 212 generates a transaction record of the processing, includes that record or part of that record in a message and transmits it to self-service terminal 210. Based on the record received at terminal 210, the terminal 210 may instruct one or more output devices to act, e.g. dispense cash or print a receipt. Self-service terminal 210 may send a further confirmation message to information management system 202. System 200 can be adapted to use any one or a number of different devices and/or different markup languages in addition to those illustrated and described herein.

FIG. 3 illustrates an example architecture for a thin-client self-service terminal. Self-service terminal can include a processor 302 and other components coupled to an input-output channel for gathering data and transmitting a message. As illustrated in FIG. 3, the self-service terminal can further include card reader 306, keypad 308, cash dispenser 310, memory 312, network interface card (NIC) 314, input-output (I/O) channel 316, graphical output 318, function key pad 230, touch screen 322, and printer 334.

Processor 302 can execute operating system (OS) 326. In some embodiments, OS 326 and browser 324 can reside in memory 312. Processor 302 can be configured to instruct a plurality of devices via input-output (I/O) channel 316. For example, processor 302 can access card reader 306 and collect data from card reader 306 such as track data and smart card data. Other data from card reader 306 may be received as well. Processor 302 can be configured to process the received data and create a message including a status record and a data record. Processor 302 may instruct I/O channel 316 to transmit this message via NIC 314. Additional data may be included in the message as acquired by processor 302 and stored in memory 312 via I/O channel 316 through keypad 308, function key pad 230, and touch screen 322.

OS 326 and/or browser 324 can be configured to provide data to graphical output 318 to display output to a user and to provide a printout to the user through printer 334. For example, if the self-service terminal is configured to dispense money, processor 302 could receive an instruction to generate a message and transmit the message through the NIC 314. Following transmission of the message, processor 302 may receive a message received via NIC 314 and I/O channel 316 containing authentication information which the processor can store in memory 312 and use to instruct cash dispenser 310 to provide currency to a user having been authenticated to access the currency. In some embodiments, messages received via the MC 314 or other means, such as authentication information, can be in the form of or include a structured tag. MC 314 could generally be one of any and all interfaces capable of transmitting and receiving data. Instructions to associated devices can also be provided in the form of or include a structured tag. For example, a receipt printer and/or a cash dispenser may receive a structured tag including instructions for operation.

Figure 4:
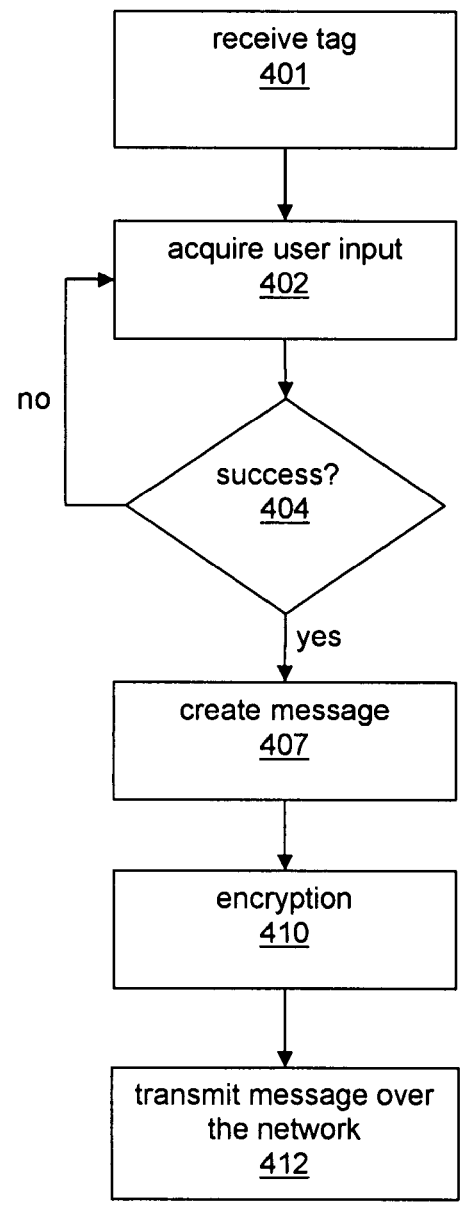
FIG. 4 depicts an example method for acquiring data.

FIG. 4 illustrates a method for acquiring data at a thin-client self-service terminal using a structured tag. As illustrated in FIG. 4, a customized structured tag is received 401 at the self-service terminal from an information management system. The structured tag can contain an identification of an input device from which input is sought and may include a description of desired information. Further, the tag may contain additional instructions directing the self-service terminal to return the user input to the information management system, and may specify an address to which the information is to be returned. For example, a web address in the form of http://xxx/yyy.asp where xxx is a server in an information management system and yyy is an active service page could be used. While some embodiments can use HTML and/or HTTP, these protocols are not required and other languages and protocols could be used.

At step 402, user input can be acquired. In some embodiments, user input can be acquired by devices such as a keypad, a touch screen, a function key pad, and a card reader. Other input devices could be used. Next, the self-service terminal can determine if user input was successfully acquired 404. If data was successfully acquired, the terminal can proceed to create a message 407 based on the acquired data. If data was not successfully acquired, the terminal proceeds 404 re-acquire user data 402 by the physical entry data module. As a non-limiting example, the message could include a status record such as date and time information relating to the time that the data was acquired. In some embodiments, the user input may not be included in the message. In some embodiments, the message could include a user's identification number as entered into a pin pad, or a user's requests as entered into a keypad. After message creation, the message can be encrypted 410 to securely transform the data record. The encrypted message can be transmitted 412 to the information management system over the network.

Figure 5:
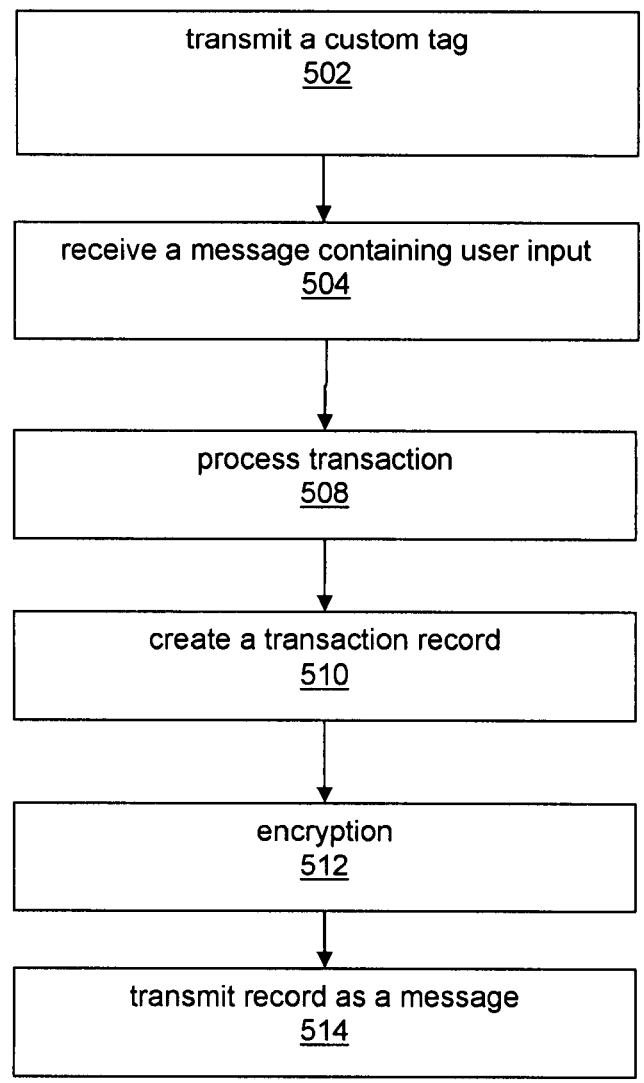
FIG. 5 depicts an example method for processing data.

FIG. 5 illustrates a method 500 for transmitting structured tag data from a thin-client self-service terminal. As illustrated in FIG. 5, a server can transmit a customized tag to a self-service terminal 502. Upon receipt of the structured tag, the self-service terminal can acquire input from a user based on the structured tag and transmit some or all of that input to the server as a message, which is encrypted. A message containing the requested data is received 504 at the server. The transaction can then be processed 508 and a transaction record created 510. Information relating to the processing of the transaction results in new structured tag data being sent to the self-service terminal, e.g. to display the results of the transaction or to instruct the terminal to print transaction results or to instruct the terminal to dispense a certain amount of cash. In some embodiments, the message data can also be encrypted 512 and then sent to the self-service terminal 514.

FIG. 6 depicts an example embodiment of HTML code 600 containing multiple customized tags. FIG. 6 illustrates two sets of customized tags 602 and 604 that can be natively interpreted by a browser. In the example illustrated in FIG. 6, HTML is used to create the customized tags. Customized tags 602 and 604 are directed to acquiring user input as to a language selection. Customized tag 602 is directed to the English language and customized tag 604 is directed to the Spanish language. The input device to be used is a keypad. Upon the press of a key directed to the English language, user is directed to the appropriate English\EnterPin.htm page which will be displayed in the English language. In the alternative, upon the press of a key directed to the Spanish language the user is redirected to Spanish\EnterPin.htm, which will be displayed in Spanish. Similar functions can be performed using custom XML tags. FIG. 7 illustrates an example of an XML formatted page 700. XML formatted page 700 includes custom tags 701 directed to a button for selecting the English language and custom tags 702 directed to a button for selecting the Spanish language.

Many specific details of certain embodiments of the invention are set forth in the description and in FIGS. 1-7 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A method of acquiring user data at a client terminal, comprising:
   downloading, by the client terminal, a web page from a remote server that performs a transaction through the client terminal, the web page including a request from the remote server for the user data via a custom terminal browser executed by the client terminal;
   displaying, by the client terminal, the web page by the custom terminal browser;
   receiving, by the client terminal, a first custom structured tag from the remote server by the custom terminal browser, wherein the client terminal further comprises a network interface card, and wherein receiving further includes receiving the first custom structured tag through the network interface card;
   wherein the first custom structured tag is unique to the custom terminal browser, identifies an input device of the client terminal for obtaining the user data from the user, includes instructions for transmitting the user data to the remote server, and causes the custom terminal browser to operate the input device to obtain the data from the user of the client terminal;
   identifying, by the client terminal, the input device within the first custom structured tag by the custom terminal browser;
   operating, by the client terminal, the input device based upon the contents of the first custom structured tag by the custom terminal browser after determining operation of the input device is authorized, wherein operating further includes altering a display interface associated with the input device for a language selected by the user before operating the input device based on the contents and based on a customized language tag activated by a selection of the user of a button for the client terminal;
   obtaining, by the client terminal, the data from the user by the custom terminal browser via the input device, the data acquired by a specific tag used to identify the input device and request the data from the input device;
   creating, by the client terminal, an electronic message based on the data including a second custom structured tag by the custom terminal browser;
   encrypting, by the client terminal, the created electronic message;
   transmitting, by the client terminal, the encrypted electronic message to the remote server by the custom terminal browser;
   wherein the custom terminal browser is configured to native communicate with the remote server using the first and second custom structured tags; and
   operating, by the client terminal, the method as a thin-client terminal.

2. The method of claim 1, further comprising receiving, by the client terminal and from the remote server a third custom structured tag identifying an output device of the client terminal and an action to be performed by the output device by the custom terminal browser.

3. The method of claim 2, wherein the output device comprises:
   a printer and the action includes printing a transaction record; and
   wherein the custom terminal browser selects the printer based upon contents of the third custom structured tag and causes the printer to print the transaction record.

4. The method of claim 1, wherein the custom structured tag includes extensible markup language (XML).

5. The method of claim 1, wherein the input device comprises one selected from a card reader, a touch screen, a pin pad, and a function key pad.

6. The method of claim 1 wherein updating to enhance a user's experience with the transaction at the client terminal is performed at the server by updating the web page.

7. The method of claim 1 wherein the custom terminal browser is configured to communicate with output devices of the client terminal.

8. The method of claim 1 wherein the structured tag specifies an address to which the data from the user is to be returned.

9. The method of claim 8 wherein the electronic message to the remote server is transmitted through a network interface card.

10. A method of acquiring user data at a client terminal, comprising:
    downloading, by the client terminal, a web page from a remote server that performs a transaction through the client terminal, the web page including a request from the remote server for the user data via a custom terminal browser executed by the client terminal;

displaying, by the client terminal, the web page by the custom terminal browser;

receiving, by the client terminal, a first custom structured tag from the remote server by the custom terminal browser, wherein the client terminal further comprises a network interface card, and wherein receiving further includes receiving the first custom structured tag through the network interface card;

wherein the first custom structured tag is unique to the custom terminal browser, identifies a card reader of the client thin-client terminal and a card data track containing the user data, includes instructions for transmitting the user data to the remote server, and causes the custom terminal browser to operate the card reader to obtain the data from the user of the client terminal and altering a display interface associated with the card reader for a language selected by the user before operating the card reader based on the first custom structured tag that represents a customized language tag activated by a selection of the user of a button for the client terminal;

identifying, by the client terminal, the card reader and the card data track within the first custom structured tag by the custom terminal browser;

operating, by the client terminal, the card reader to obtain the user data from the card data track by the custom terminal browser after determining operation of the card reader is authorized, the user data obtained by using a specific tag identifying the card reader and requesting the user data from card reader;

creating, by the client terminal, an electronic message based on the data including a second custom structured tag by the custom terminal browser;

encrypting, by the client terminal, the created electronic message;

transmitting, by the client terminal, the encrypted electronic message to the remote server by the custom terminal browser;

wherein the custom terminal browser is configured to communicate with the remote server using the first and second custom structured tags; and operating, by the client terminal, the method as the thin-client terminal.

11. A method of acquiring user data at a client terminal, comprising:

downloading, by the client terminal, a first web page from a remote server that performs a transaction through the client terminal, the first web page including a request from the remote server for the user data via a custom terminal browser executed by the client terminal;

displaying, by the client terminal, the first web page by the custom terminal browser;

receiving, by the client terminal, first and second custom structured tags from the remote server by the custom terminal browser, wherein the client terminal further comprises a network interface card, and wherein receiving further includes receiving the first custom structured tag through the network interface card;

wherein the first custom structured tag is unique to the custom terminal browser, identifies a key pad of the client terminal, a first key of the key pad for entering a first possible user response, and a first web page from the remote server to be displayed by the custom terminal browser based upon receipt of the first possible user response, includes instructions for transmitting the user data to the remote server, and causes the custom terminal browser to operate the key pad to obtain the first possible response when entered by the user of the client terminal, and wherein a display interface associated with the key pad for a language selected by the user before operating the key pad based on the first custom structured tag representing a customized language tag activated by a selection of the user of a button for the client terminal;

wherein the second custom structured tag is unique to the custom terminal browser, identifies the key pad of the client terminal, a second key of the key pad for entering a second possible user response, and a second web page from the remote server to be displayed by the custom terminal browser based upon receipt of the second possible user response, and causes the custom terminal browser to operate the key pad to obtain the second possible response when entered by the user of the client terminal based on the second custom structured tag;

identifying, by the client terminal, the key pad within the first and second custom structured tags by the custom terminal browser;

operating, by the client terminal, the key pad to obtain one of the first and second possible responses by the custom terminal browser after determining operation of the input device is authorized;

creating, by the client terminal, an electronic message containing a received response from the user including a third custom structured tag by the custom terminal browser;

encrypting, by the client terminal, the created electronic message;

transmitting, by the client terminal, the encrypted electronic message to the remote server by the custom terminal browser;

displaying, by the client terminal, one of the first and second web pages based upon the received response from the user by the custom terminal browser;

wherein the custom terminal browser is configured to communicate with the remote server using the first, second, and third custom structured tags; and operating, by the client terminal, the method as a thin-client terminal.

* * * * *